(12) United States Patent
Mayer et al.

(10) Patent No.: US 9,985,811 B2
(45) Date of Patent: May 29, 2018

(54) PAPR REDUCTION FOR IQ RFDAC

(71) Applicant: Intel IP Corporation, Santa Clara, CA (US)

(72) Inventors: Christian Mayer, Wilhering (AT); Franz Kuttner, St. Ulrich (AT)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

(21) Appl. No.: 15/274,721

(22) Filed: Sep. 23, 2016

(65) Prior Publication Data

US 2018/0091338 A1 Mar. 29, 2018

(51) Int. Cl.
*H04B 1/04* (2006.01)
*H04L 27/08* (2006.01)
*H04B 1/00* (2006.01)

(52) U.S. Cl.
CPC ........... *H04L 27/08* (2013.01); *H04B 1/0042* (2013.01); *H04B 1/04* (2013.01)

(58) Field of Classification Search
USPC .................................................. 455/91–108
See application file for complete search history.

(56) References Cited

U.S. PATENT DOCUMENTS

| | | | | |
|---|---|---|---|---|
| 6,931,239 B2 * | 8/2005 | Hongo | ................ | H04L 27/2623 375/296 |
| 7,643,801 B2 * | 1/2010 | Piirainen | ............... | H03F 1/0205 375/296 |
| 2002/0197966 A1 * | 12/2002 | Taskinen | ............. | H04L 27/3411 455/110 |
| 2003/0086507 A1 * | 5/2003 | Kim | .................... | H04L 27/2624 375/297 |
| 2006/0120479 A1 * | 6/2006 | Cai | ..................... | H04L 27/2624 375/296 |
| 2006/0154622 A1 * | 7/2006 | Piirainen | ............... | H03F 1/0205 455/115.1 |
| 2006/0227906 A1 | 10/2006 | Horikoshi | | |

(Continued)

OTHER PUBLICATIONS

"International Application Serial No. PCT/US2017/048116, International Search Report dated Nov. 20, 2017", 4 pgs.

(Continued)

*Primary Examiner* — Lana N Le
(74) *Attorney, Agent, or Firm* — Schwegman Lundberg & Woessner, P.A.

(57) ABSTRACT

Disclosed herein is an apparatus and methodology for reducing peak-to-average-power ratio (PAPR) for IQ radio frequency digital-to-analog converter (RFDAC). Processing circuitry may be configured to generate a digital signal comprising an in-phase (I) signal component and a quadrature (Q) signal component having a peak-to-average-power-ratio (PAPR). The processing circuitry may determine the I signal component and the Q signal component are higher than a predetermined threshold value, and limit the I signal component and the Q signal component to be less than or equal to the predetermined threshold value. The processing circuitry may rotate the signal components to generate rotated signal components to reduce the PAPR based on the I and Q signal components having less than or equal to the predetermined threshold value, and may generate an output radio frequency (RF) signal based on the rotated signal components.

26 Claims, 8 Drawing Sheets

(56) References Cited

U.S. PATENT DOCUMENTS

| | | |
|---|---|---|
| 2007/0087705 A1 | 4/2007 | Teramoto |
| 2008/0150625 A1 | 6/2008 | Sundstrom |
| 2010/0109734 A1* | 5/2010 | Rylov .................. H03H 11/20 327/256 |
| 2012/0056676 A1* | 3/2012 | Frambach ............. H03F 3/193 330/295 |
| 2014/0146913 A1* | 5/2014 | Kuttner ................ H03M 1/66 375/295 |
| 2014/0254720 A1 | 9/2014 | Deng et al. |
| 2016/0094235 A1 | 3/2016 | Kuttner et al. |
| 2016/0127164 A1 | 5/2016 | Muhammad et al. |

OTHER PUBLICATIONS

"International Application Serial No. PCT/US2017/048116, Written Opinion dated Nov. 20, 2017", 8 pgs.

* cited by examiner

- - - |I| + |Q| <= N (RFDAC LIMIT)
——— MAX POSSIBLE TRAJECTORY BOUNDARY AFTER CLASSICAL PAPR RED
·········· MAX POSSIBLE TRAJECTORY BOUNDARY AFTER NEW PAPR RED
—·— ORIGINAL SIGNAL RMS
—··— SIGNAL RMS AFTER PAPR REDUCTION

— TRAJECTORY SHAPE AFTER CLIPPING |I| AND |Q|
······ ROTATED SIGNAL TRAJECTORY SHAPE

— — |I|+|Q|=X
● signal point to be clipped
▪ clipped signal point

PAPR REDUCTION FOR IQ RFDAC

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and 5G networks, although the scope of the embodiments is not limited in this respect. Some embodiments relate to peak-to-average-power ratio (PAPR) reduction for IQ radio frequency digital-to-analog converter (RFDAC).

BACKGROUND

With the increase in different types of devices communicating with various network devices, usage of 3GPP LTE systems has increased. The penetration of mobile devices (user equipment or UEs) in modern society has continued to drive demand for a wide variety of networked devices in a number of disparate environments. The use of networked UEs using 3GPP LTE systems has increased in all areas of home and work life. Fifth generation (5G) wireless systems are forthcoming, and are expected to enable even greater speed, connectivity, and usability.

One concern with RF signal transmitting devices is that quadrature digital-to-analog converters (DACs) used in generating the RF signal suffer a power penalty when converting signals with circular boundary shape of the trajectory in the complex plane, in comparison to polar RF DACs which convert only amplitude signal. Therefore, a measure taken to decrease the signal PAPR would increase the RFDAC efficiency, which is essential for achieving low power consumption.

BRIEF DESCRIPTION OF THE FIGURES

In the figures, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

DETAILED DESCRIPTION

The following description and the drawings sufficiently illustrate specific embodiments to enable those skilled in the art to practice them. A number of examples are described in the context of 3GPP communication systems and components thereof. It will be understood that principles of the embodiments are applicable in other types of communication systems, such as Wi-Fi or WiMax networks, Bluetooth or other personal-area networks, Zigbee or other home-area networks, wireless mesh networks, and the like, without limitation, unless expressly limited by a corresponding claim. Given the benefit of the present disclosure, persons skilled in the relevant technologies will be able to engineer suitable variations to implement principles of the embodiments in other types of communication systems. Various diverse embodiments may incorporate structural, logical, electrical, process, and other differences. Portions and features of some embodiments may be included in, or substituted for, those of other embodiments. Embodiments set forth in the claims encompass all presently-known, and after-arising, equivalents of those claims.

Figure 1:
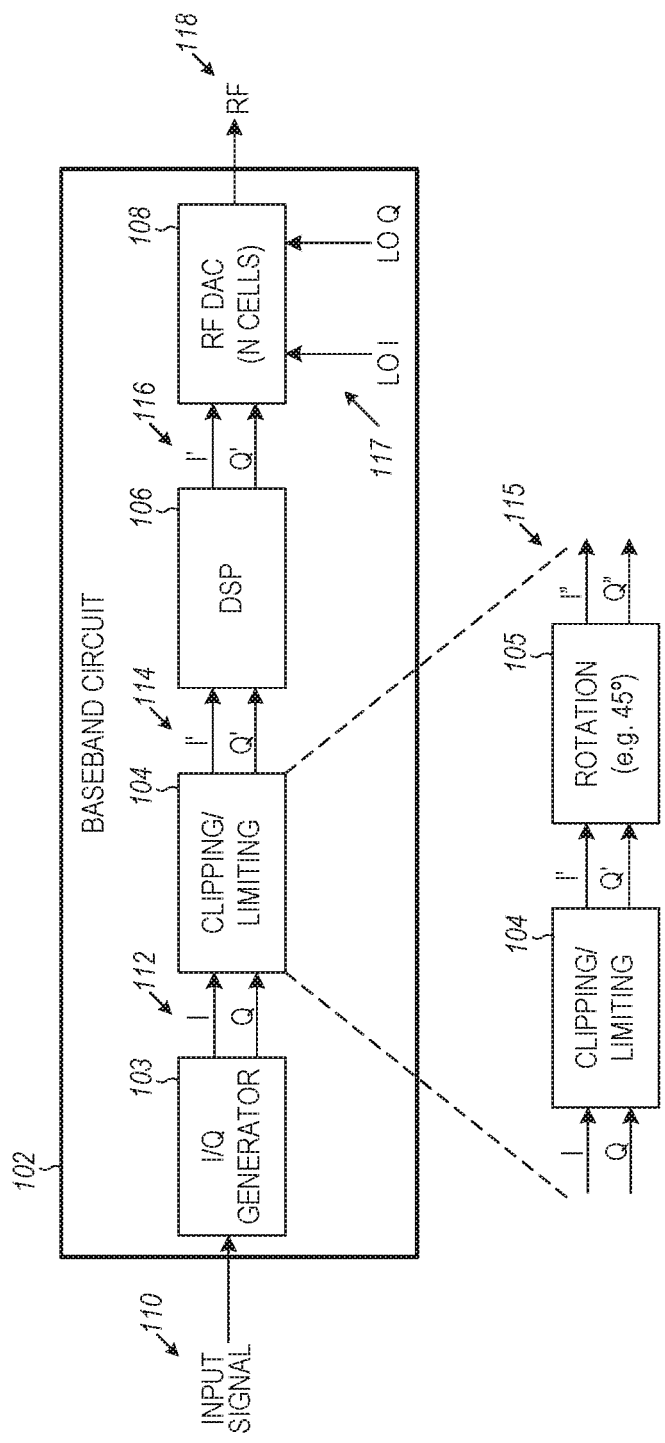
FIG. 1 is a block diagram of a baseband circuit using PAPR reduction for an IQ RFDAC, in accordance with some embodiments.

FIG. 1 is a block diagram of a baseband circuit using PAPR reduction for an IQ RFDAC, in accordance with some embodiments. Referring to FIG. 1, there is illustrated a baseband circuit 102, which may be used to convert an input digital signal 110 to a radio frequency (RF) output signal 118. More specifically, the baseband circuit 102 may include an in-phase (I) and quadrature (Q) signal component generator 103. The I/Q generator may comprise suitable circuitry, logic, interfaces and/or code and may be configured to generate I and Q signal components 112 corresponding to the input digital signal 110.

The baseband circuit 102 may further include an RF digital-to-analog converter (DAC) 108. The RF DAC 108 may comprise suitable circuitry, logic, interfaces and/or code and may be configured to generate the output RF signal 118 based on I and Q signal components 116. The RF DAC 108 may include a plurality (e.g., N number) of thermometer-coded DAC cells. The peak output power of the RF DAC 108 corresponds to the maximum number of used cells. Therefore, the maximum number of cells (e.g., N) corresponds to the maximum peak power the RF DAC is able to output. The peak output power of the RF DAC for a given IQ signal may be derived by max(|I|+|Q|), which is the maximum of the sum of absolute values of the I and Q component signal.

As seen in FIG. 1, the IQ RF DAC 108 has four inputs—I/Q signal inputs 116 and local oscillator (LO) I and Q inputs 117. In an example, a peak-to-average-power-ratio (PAPR) reduction may be applied to the IQ signal input prior to feeding it to the RF DAC 108, in order to increase the efficiency of the RF DAC 108, thereby contributing to an increase in signal output power (e.g., when the output signal RF 118 is transmitted). In one example, a PAPR reduction scheme may be applied by performing signal envelope limitation/clipping based on instantaneous magnitude of the I/Q signal (e.g., the signal magnitude may be expressed as square-root of ($I^2+Q^2$)). Signal limitation of this kind, however, applies to all I/Q signal values, which in effect reduces the signal trajectory boundary radius at the same root-mean-square (RMS) signal power (as explained in reference to FIGS. 2-3 below).

In another example (and unlike the previous example where signal envelope limitation is applied based on the instantaneous magnitude of the signal), I and Q signal component limitation may be performed instead (without the need of signal magnitude limitation), limiting only those parts of the signal which are closest or exceed the signal boundary given by the IQ RF DAC implementation (e.g., the signal boundary associated with using a maximum of N thermometer-coded cells within the RF DAC 108). In this regard, in comparison to the magnitude-based PAPR reduction schemes mentioned above, an improved PAPR reduction at the same degradation levels (e.g., error vector magnitude (EVM) or spectral emissions) can be achieved by using the I/Q signal component limitation.

In an example, each of the N thermometer-coded cells of the RF DAC 108 can dynamically switch between using I and LO_I or Q and LO_Q signals. In this regard, any of the N thermometer-coded cells can be either an I cell or a Q cell. The DAC 108 may be implemented as a signed DAC so that it converts the absolute values of I and Q. Since there is a maximum of N thermometer-coded cells in the RF DAC 108, the input I/Q signal has to fulfill the condition $|I|+|Q|\leq N$.

Figure 2:
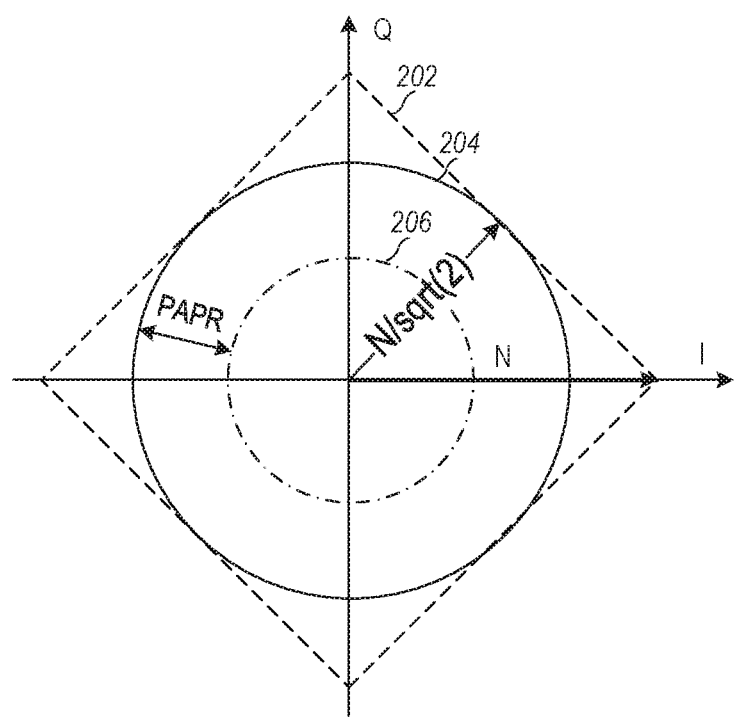
FIG. 2 is a diagram illustrating an IQ RFDAC input limit and a signal with circular-shaped trajectory boundary, in accordance with some embodiments.

FIG. 2 is a diagram illustrating an IQ RFDAC input limit and a signal with circular-shaped trajectory boundary, in accordance with some embodiments. Referring to FIG. 2, there is illustrated a signal with a circular trajectory boundary in the complex plane. If the signal is to be converted by the RF DAC 108, the signal will be limited to the boundary 202 satisfying the condition $|I|+|Q|\leq N$. The complex signal is, therefore, limited to a maximum signal trajectory boundary of 204, with a circular signal radius of $N/\sqrt{2}$, as seen in FIG. 2.

The radius of the circular signal 204, $N/\sqrt{2}$, corresponds to the maximum peak power of the converted signal, and the maximum RMS value 206 may be given by the formula $RMS=N/\sqrt{2}/10^{(PAPR/20)}$. To achieve a better efficiency of the RF DAC 108, the RMS power of the signal may be increased, while maintaining the same DAC implementation. Another possibility for achieving better efficiency is to design the RF DAC for lower possible peak power (because of lower PAPR due to the PAPR reduction) and maintain the same maximum possible RMS power. A decision on what way to use for achieving a better efficiency may be dependent on what parameter is more critical, maximum RMS output power or total power consumption.

In some instances, an increase of the RMS may violate the given peak limits (e.g., 202), and, therefore, PAPR reduction prior to the RF DAC 108 may be performed in instances when the RMS is increased. As explained above, a magnitude-based PAPR reduction is based on clipping (or limiting) of the signal magnitude, which effectively reduces the trajectory boundary radius at the same RMS power. The RMS may then be increased until the peak power again reaches the limit of the given RF DAC implementation (i.e., fits within the 202 boundary).

As an alternative approach to PAPR reduction, the number of values that are clipped can be reduced (as also explained above in reference to the I/Q limitation based approach). More specifically, I and Q values that exceed the DAC limit (i.e., values that are outside of the trajectory 202) can be clipped/limited, after increasing the signal RMS.

Figure 3:
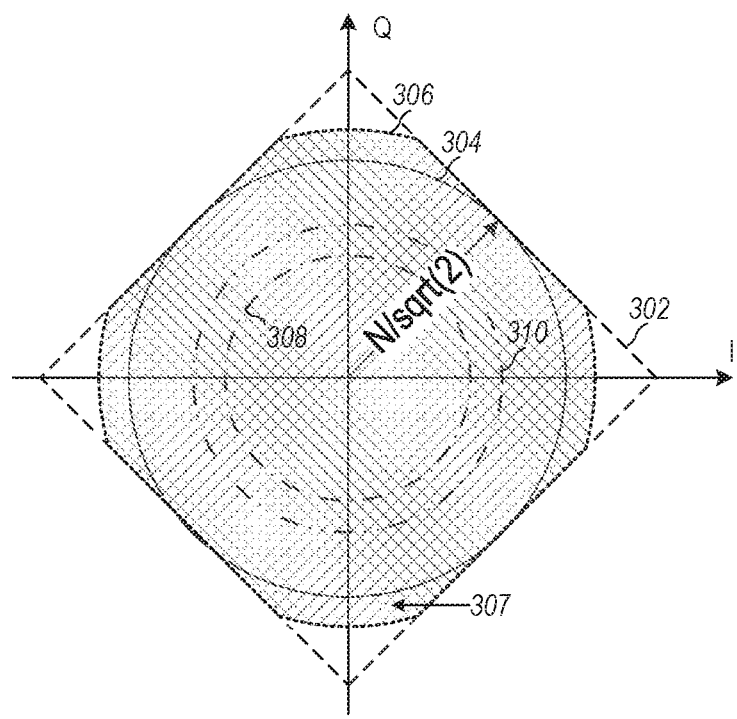
FIG. 3 is a diagram illustrating trajectory boundaries and root-mean-square (RMS) values for PAPR-reduction-applied signals, in accordance with some embodiments.

FIG. 3 is a diagram illustrating trajectory boundaries and root-mean-square (RMS) values for PAPR-reduction-applied signals, in accordance with some embodiments. Referring to FIG. 3, there is illustrated the RF DAC limit boundary 302, which is based on the condition $|I|+|Q|\leq N$. A complex I/Q signal may have an initial signal RMS boundary 308. After magnitude-based PAPR reduction, the signal RMS can be increased to 310, until the signal fits on the maximum signal trajectory boundary 304.

In another example, the I/Q signal limitation approach can be used for PAPR reduction (also referred herein as "IQ-based PAPR reduction"). More specifically, the signal RMS can be increased from boundary 308 to 310, which results in expanding the signal boundary beyond the boundary 304. I and Q signal components that are outside the RF DAC limit boundary 302 may then be clipped, resulting in signal boundary 306. As seen in FIG. 3, there are four signal areas 307 that are outside of the maximum signal trajectory boundary 304 (under the magnitude-based PAPR reduction approach), where the complex I/Q signal is not clipped/limited but is still characterized by the reduced PAPR and increased RMS 310. In this regard, by using the IQ-based PAPR reduction approach, the RMS can be increased (e.g., from 308 to 310), while (in contrary the magnitude-based PAPR reduction approach) the signal clipping/limiting is applied only to those values that exceed the RF DAC limits associated with boundary 202. In this regard, less signal values are affected by the clipping function, which results in reduced signal degradation under the IQ-based PAPR reduction approach.

In an example, the IQ-based PAPR reduction may be implemented by limiting the input signal prior to DAC processing, where the limiting is based on the condition $|I|+|Q|\leq N$. In another example, the input signal may be limited by limiting individual I and Q values to satisfy the following conditions:

$|I|\leq N/\sqrt{2}$ and $|Q|\leq N/\sqrt{2}$. After the signal is clipped (or limited), the signal can be rotated by, e.g., 45 degrees so that the resultant signal shape can match the desired signal shape associated with the IQ-based PAPR reduction (e.g., 306 in FIG. 3).

Figure 4A:
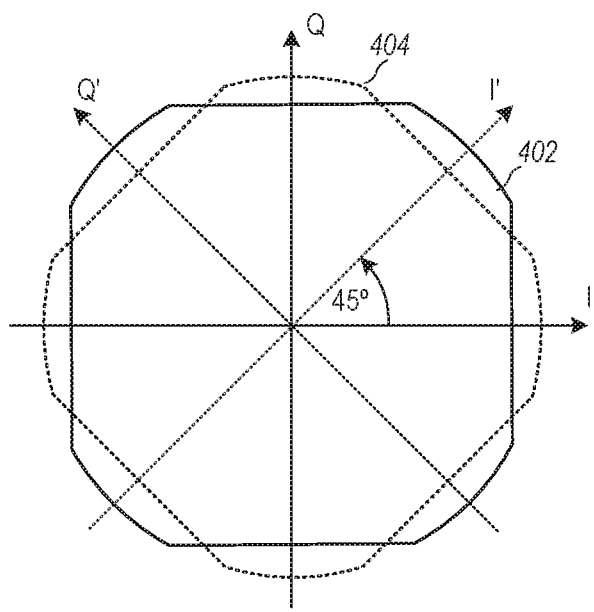
FIG. 4A is a diagram illustrating a signal constellation shape of a signal after individual I and Q limitation and subsequent rotation, in accordance with some embodiments.

FIG. 4A is a diagram illustrating a signal constellation shape of a signal after individual I and Q limitation and subsequent rotation, in accordance with some embodiments. Referring to FIG. 4A, there is illustrated a signal trajectory 402, which results after an IQ signal is clipped based on the conditions $|I|\leq N/\sqrt{2}$ and $|Q|\leq N/\sqrt{2}$. Subsequent to signal clipping, a rotation may be performed by 45 degrees, resulting in signal trajectory 404. As seen from FIGS. 3 and 4, the resulting signal trajectory 404 is the same as the desired signal trajectory 306 associated with the IQ-based PAPR reduction approach.

Referring again to FIG. 1, the baseband circuit 102 may comprise a clipping block 104 and a rotation block 105, which may comprise suitable circuitry, logic, interfaces and/or code and may be configured to perform signal clipping/limiting and signal rotation, respectively. The clipping block 104 may clip the I/Q signal 112 to generate clipped I'/Q' signal 114. The clipping may be performed based on the following approach expressed in pseudo code:

```
If (I>X) then I'=X,
    else if (I<-X) then I'=-X,
    else I'=I;
If (Q>X) then Q'=X,
    else if (Q<-X) then Q'=-X,
    else Q'=Q, where X is the same as N (i.e., it is the total number of
thermometer-coded DAC cells).
```

In another example, the clipping block 104 may implement I/Q signal clipping based on the following approach expressed in pseudo code:

```
If (|I|>X) then
    I'=X*sign(I);
    else I'=I;
If (|Q|>X) then
    Q'=X*sign(Q):
    else Q'=Q,
where the sign(I) and sign(Q) operations are −1 or 1, based on whether I
(or Q) is negative or positive.
```

In an example, the signal rotation block 105 may rotate the clipped I'/Q' signal 114 to generate signal I"/Q" 115. The signal rotation may be by 45 degrees or another angle. Rotation by 45 degrees may be implemented by, for example, applying the following equations:

$$I''=1/\text{sqrt}(2)*(I'-Q') \text{ and}$$

$$Q''=1/\text{sqrt}(2)*(Q'+I').$$

Figure 4B:
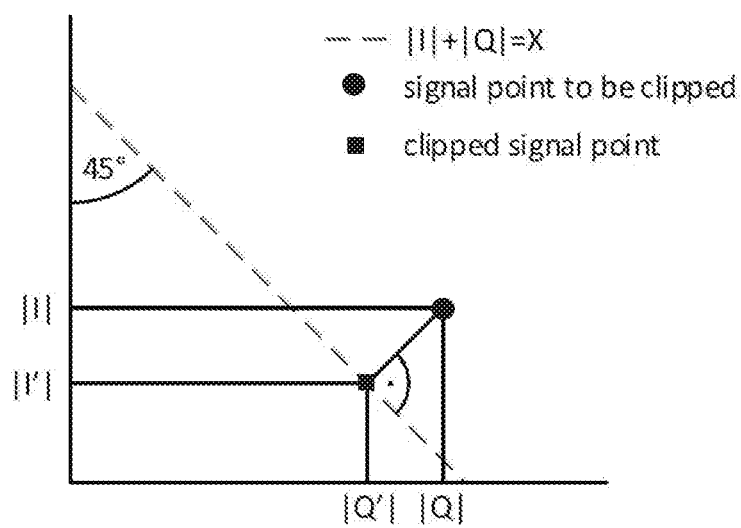
FIG. 4B illustrates an alternative approach to the clipping and rotating approach of FIG. 4A, to achieve PAPR reduction, in accordance with an example embodiment.

FIG. 4B illustrates an alternative approach to clipping and rotating to achieve PAPR reduction, in accordance with an example embodiment. In an example, the clipping block 104 may be implemented without a rotation block 105. In this case, instead of clipping the signal and then performing rotation to achieve the desired signal trajectory shape (e.g., 306 and 404), the clipping block 104 may directly "project" the point which is outside of the RF DAC limit (i.e., outside of boundary 202 or 302) to the 45-degree limit of the RF DAC (i.e., project to a point that is on the boundary 202 or 302), as seen in FIG. 4B. To implement the alternative approach, the clipping block 104 may process the input I/Q signal 112 based on the following equations:

```
If (|I|+|Q|) > N, then
    I'=(I−Q) + N)/2,
    Q'=I'−(I−Q),
    I' = I'*sign(I),
    Q'=Q'*sign(Q), where N is the number of thermometer-
    coded cells used by the DAC 108.
```

In an example, the baseband circuit 102 may further include a digital signal processor (DSP) 106, which may be used to perform additional signal processing prior to the RF signal generation. Example DSP signal processing includes signal filtering, upsampling, and so forth. In an example, DSP processing may be done prior to clipping and/or after rotation.

Figure 5A:
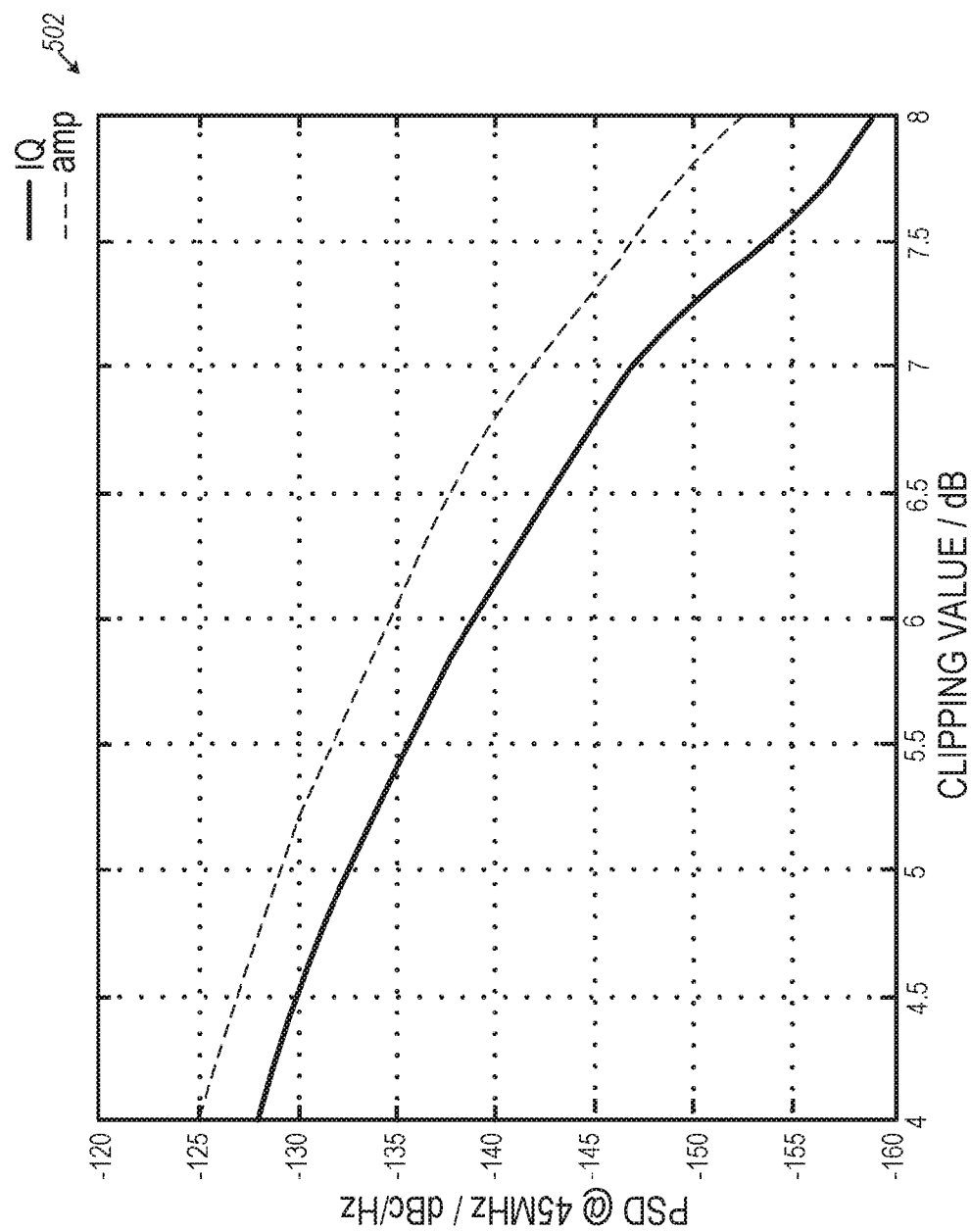
FIG. 5A and FIG. 5B are diagrams of simulation result graphs of a signal with different PAPR reduction techniques applied in accordance with some embodiments.
Figure 5B:
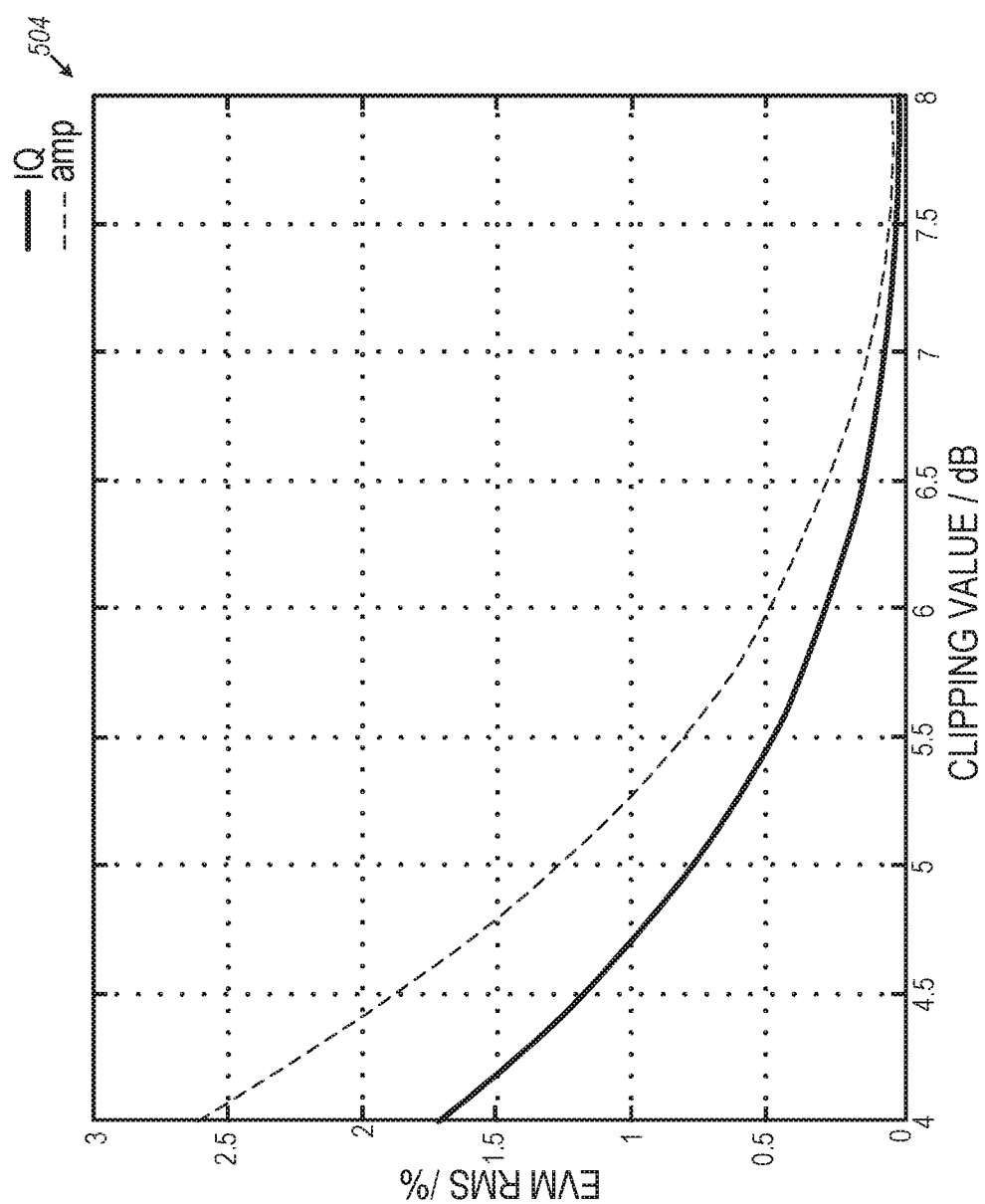

FIG. 5A and FIG. 5B are diagrams of simulation result graphs of a signal with different PAPR reduction techniques applied in accordance with some embodiments. Referring to FIG. 5A, there is illustrated a power spectral density (PSD) graph 502 associated with simulation results of a signal with PAPR reduction under the IQ-based approach ("IQ") and the magnitude-based approach ("amp"). Referring to FIG. 5B, there is illustrated an error vector magnitude (EVM) graph 504 associated with simulation results of a signal with PAPR reduction under the IQ-based approach ("IQ") and the magnitude-based approach ("amp").

As seen from the graphs in FIG. 5A and FIG. 5B, an improvement of approximately 0.5 dB of clipping for the same performance can be achieved under the IQ-based PAPR reduction approach.

Figure 6:
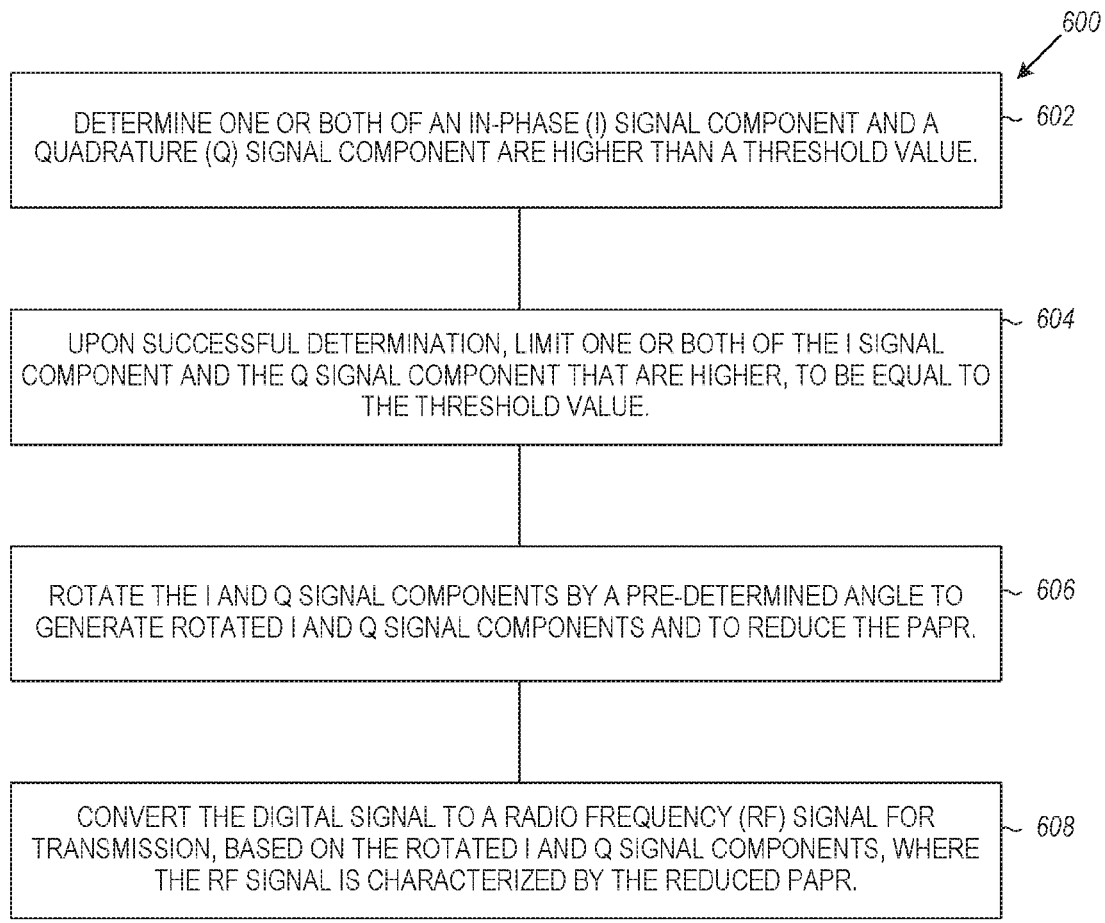
FIG. 6 is a flow diagram illustrating example functionalities for PAPR reduction for an IQ RFDAC, in accordance with some embodiments.

FIG. 6 is a flow diagram illustrating example functionalities for PAPR reduction for an IQ RFDAC, in accordance with some embodiments. Referring to FIGS. 1 and 6, an example method 600 for reducing peak-to-average-power-ratio (PAPR) of a digital signal with an in-phase (I) signal component and a quadrature (Q) signal component may start at 602. More specifically, at 602, it may be determined whether one or both of the I signal component and the Q signal component are higher than a threshold value. For example, the clipping block may make a determination whether |I|>N/sqrt(2) and |Q|>N/sqrt(2), where N is the number of thermometer-coded DAC cells used by the DAC 108 (the threshold value may be N/sqrt(2)).

In one embodiment (e.g., in an alternative clipping approach without rotation as illustrated in FIG. 4B), the sum of |I| and |Q| may be compared with the threshold value. In other instances, instead of comparing I and Q to a threshold value, their absolute values |I| and |Q| may be compared instead.

At 604, upon successful determination that one or both of the I signal component and the Q signal component that are higher, such components may be limited to be equal to the threshold value. Put another way, the I and Q signal components may be clipped to satisfy the following conditions: |I|≤N/sqrt(2) and |Q|≤N/sqrt(2).

At 606, the I and Q signal components may be rotated by a predetermined angle to generate rotated I and Q signal components and to reduce the PAPR. For example, the clipped I'Q' signal components 114 may be rotated by the rotation block 105 to generate rotated signal components I"/Q" 115. At 608, the digital signal can be converted to a radio frequency (RF) signal for transmission, based on the rotated I and Q signal components. For example, the rotated signal components I"/Q" 115 can be converted by the DAC 108 to the output RF signal 118, where the RF signal is characterized by the reduced PAPR.

Figure 7:
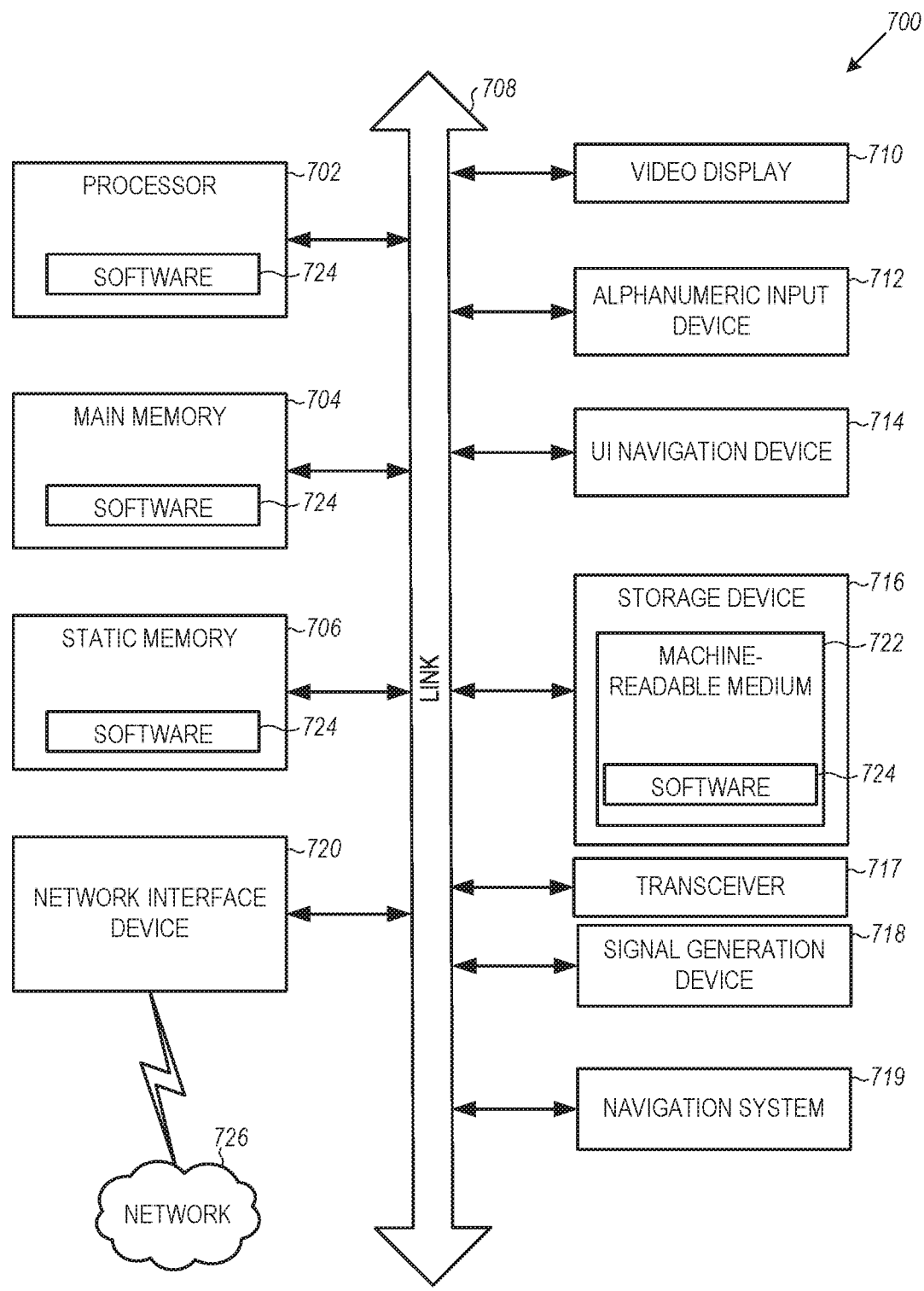
FIG. 7 illustrates a block diagram of a communication device such as an eNB or a UE, in accordance with some embodiments.

FIG. 7 illustrates a block diagram of a communication device such as an eNB or a UE, in accordance with some embodiments. In alternative embodiments, the communication device 700 may operate as a standalone device or may be connected (e.g., networked) to other communication devices. In a networked deployment, the communication device 700 may operate in the capacity of a server communication device, a client communication device, or both in server-client network environments. In an example, the communication device 700 may act as a peer communication device in peer-to-peer (P2P) (or other distributed) network environment. The communication device 700 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The communication device 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The communication device 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The communication device 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a communication device readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the communication device 700. In an example, one or any combination of the hardware processor 702, the main memory 704, the static memory 706, or the storage device 716 may constitute communication device readable media.

While the communication device readable medium 722 is illustrated as a single medium, the term "communication device readable medium" may include a single medium or multiple media (e.g., a centralized or distributed database, and/or associated caches and servers) configured to store the one or more instructions 724.

The term "communication device readable medium" may include any medium that is capable of storing, encoding, or carrying instructions for execution by the communication device 700 and that cause the communication device 700 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), MIMO, or multiple-input single-output (MISO) techniques. In some examples, the network interface device 720 may wirelessly communicate using Multiple User MIMO techniques. The term "transmission medium" shall be taken to include any intangible medium that is capable of storing, encoding or carrying instructions for execution by the communication device 700, and includes digital or analog communications signals or other intangible medium to facilitate communication of such software.

In an example, the communication device 700 may further include a transceiver 717. The transceiver 717 may include baseband circuitry, such as baseband circuit 102, and may be configured to perform one or more of the PAPR reduction functionalities disclosed herein.

ADDITIONAL NOTES AND EXAMPLES

Example 1 is an apparatus of a wireless device, the apparatus comprising: memory; and processing circuitry configured to: generate a digital signal, the digital signal comprising an in-phase (I) signal component and a quadrature (Q) signal component, the digital signal associated with a peak-to-average-power-ratio (PAPR); determine the I signal component and the Q signal component are each higher than a threshold value; upon successful determination, limit the I signal component and the Q signal component to be less than or equal to the threshold value; and rotate the signal components to generate rotated signal components to reduce the PAPR, the rotated signal components for use in generating an output radio frequency (RF) signal.

In Example 2, the subject matter of Example 1 optionally includes digital-to-analog conversion (DAC) circuitry comprising a plurality of thermometer-coded DAC cells, the DAC circuitry configured to generate the RF signal for transmission.

In Example 3, the subject matter of Example 2 optionally includes wherein the threshold value is based on the number of thermometer-coded DAC cells.

In Example 4, the subject matter of any one or more of Examples 2-3 optionally include wherein the threshold value is the number of the DAC cells divided by square-root of two.

In Example 5, the subject matter of any one or more of Examples 1-4 optionally include wherein the processing circuitry is configured to rotate the I and Q signal components by 45 degrees.

In Example 6, the subject matter of any one or more of Examples 1-5 optionally include wherein the rotated I signal component is I' and the processing circuitry is configured to: generate I' based on the equation I'=1/sqrt(2)*(I−Q).

In Example 7, the subject matter of any one or more of Examples 1-6 optionally include wherein the rotated Q signal component is Q' and the processing circuitry is configured to: generate Q' based on the equation Q'=1/sqrt(2)*(Q+I).

In Example 8, the subject matter of any one or more of Examples 1-7 optionally include wherein the processing circuitry comprises a baseband processor.

In Example 9, the subject matter of Example 8 optionally includes wherein the baseband processor comprises: an I/Q signal generator that generates the I and Q signal components; clipping circuitry configured to limit the I signal component and the Q signal component to be less than or equal to a threshold value; and rotation circuitry configured to rotate the I and Q signal components to generate the rotated I and Q signal components.

In Example 10, the subject matter of any one or more of Examples 1-9 optionally include wherein the processing circuitry is configured to: determine one or both of the I signal component and the Q signal component are higher than the number of the DAC cells divided by square-root of two; and limit one or both of the I signal component and the Q signal component that are higher, to be equal to the number of the DAC cells divided by square-root of two.

In Example 11, the subject matter of any one or more of Examples 1-10 optionally include wherein to determine the I signal component and the Q signal component are each higher than a threshold value, the processing circuitry is configured to: determine a sum of an absolute value of the I signal component and an absolute value of the Q signal component is greater than a second threshold value; and upon successful determination, project a signal point associated with the I and Q signal components to a new signal point to reduce the PAPR, wherein the new signal point is associated with I" and Q" signal components and wherein a sum of absolute values of I" and Q" is equal to, or lower than, the second threshold value.

In Example 12, the subject matter of any one or more of Examples 1-11 optionally include wherein to project the signal point, the processing circuitry is configured to: determine I" and Q" based on the equations I"=((I−Q)+X)/2 and Q"=I"−(I−Q), wherein X is the second threshold value and the I" and Q" signal components have the same polarity sign as the I and Q signal components, respectively.

Example 13 is a method for reducing peak-to-average-power-ratio (PAPR) of a digital signal with an in-phase (I) signal component and a quadrature (Q) signal component, the method comprising: determining one or both of the I signal component and the Q signal component are higher than a threshold value; upon successful determination, limiting one or both of the I signal component and the Q signal component that are higher, to be equal to, or lower than, the threshold value; rotating the I and Q signal components by a pre-determined angle to generate rotated I and Q signal components and to reduce the PAPR; and converting the digital signal to a radio frequency (RF) signal for transmission, based on the rotated I and Q signal components.

In Example 14, the subject matter of Example 13 optionally includes assigning a polarity sign to the rotated I signal component that is the same as a polarity sign of the I signal component prior to the rotating; and assigning a polarity sign to the rotated Q signal component that is the same as a polarity sign of the Q signal component prior to the rotating.

In Example 15, the subject matter of any one or more of Examples 13-14 optionally include the method further comprising: supplying a local oscillator (LO) I signal and a LO Q signal to a plurality of thermometer-coded digital-to-analog conversion (DAC) cells to enable the converting.

In Example 16, the subject matter of Example 15 optionally includes wherein the threshold value is based on a number of the thermometer-coded DAC cells.

In Example 17, the subject matter of any one or more of Examples 13-16 optionally include wherein the pre-determined angle is a 45-degree angle.

In Example 18, the subject matter of Example 17 optionally includes wherein the rotated I signal component is I' and the method further comprises: generating I' based on the equation I'=1/sqrt(2)*(I−Q).

In Example 19, the subject matter of any one or more of Examples 17-18 optionally include wherein the rotated Q signal component is Q' and the method further comprises: generating Q' based on the equation Q'=1/sqrt(2)*(I+Q).

In Example 20, the subject matter of any one or more of Examples 13-19 optionally include determining a sum of an absolute value of the I signal component and an absolute value of the Q signal component is greater than a second threshold value.

In Example 21, the subject matter of Example 20 optionally includes upon successful determination, projecting a signal point associated with the I and Q signal components to a new signal point of a second digital signal with corresponding I" and Q" signal components, wherein a sum of absolute values of the I" and Q" signal components is equal to the second threshold value, and wherein a PAPR of the second digital signal is lower than the PAPR of the digital signal.

In Example 22, the subject matter of Example 21 optionally includes wherein the projecting further comprises: determining I" and Q" based on the equations I"=((I−Q)+X)/2 and Q"=I"−(I−Q), wherein X is the second threshold value and the I" and Q" signal components have the same polarity sign as the I and Q signal components, respectively.

Example 23 is at least one machine-readable medium that, when executed by a machine, causes the machine to perform any of the methods of Examples 13-22.

Example 24 is a device comprising means to perform any of the methods of Examples 13-22.

Example 25 is a computer-readable medium comprising instructions that, when executed on processing circuitry of a user equipment (UE), cause the UE to: generate a digital signal, the digital signal comprising an in-phase (I) signal component and a quadrature (Q) signal component, the digital signal associated with a peak-to-average-power-ratio (PAPR); determine a sum of an absolute value of the I signal component and an absolute value of the Q signal component is greater than a threshold value; upon successful determination, reduce the PAPR by projecting a signal point associated with the I and Q signal components to a new signal point with corresponding I' and Q' signal components, wherein a sum of absolute values of the I' and Q' signal components is equal to the threshold value; and convert the digital signal to a radio frequency (RF) signal for transmission, based on the I' and Q' signal components.

In Example 26, the subject matter of Example 25 optionally includes wherein the instructions further cause the UE to: determine the I' and Q' signal components based on the equations I'=((I−Q)+X)/2 and Q'=I'−(I−Q), wherein X is the threshold value and the I' and Q' signal components have the same polarity sign as the I and Q signal components, respectively.

In Example 27, the subject matter of any one or more of Examples 25-26 optionally include wherein the threshold value is a number of thermometer-coded digital-to-analog conversion (DAC) cells used for converting the digital signal to the RF signal.

Example 28 is an apparatus of a wireless device, the apparatus comprising: means for generating a digital signal, the digital signal comprising an in-phase (I) signal component and a quadrature (Q) signal component, the digital signal associated with a peak-to-average-power-ratio (PAPR); means for determining a sum of an absolute value of the I signal component and an absolute value of the Q signal component is greater than a threshold value; means for reducing the PAPR by projecting a signal point associated with the I and Q signal components to a new signal point with corresponding I' and Q' signal components upon successful determination, wherein a sum of absolute values of the I' and Q' signal components is equal to the threshold value; and means for converting the digital signal to a radio frequency (RF) signal for transmission, based on the I' and Q' signal components.

In Example 29, the subject matter of Example 28 optionally includes means for determining the I' and Q' signal components based on the equations I'=((I−Q)+X)/2 and Q'=I'−(I−Q), wherein X is the threshold value and the I' and Q' signal components have the same polarity sign as the I and Q signal components, respectively.

In Example 30, the subject matter of any one or more of Examples 28-29 optionally include wherein the threshold value is a number of thermometer-coded digital-to-analog conversion (DAC) cells used for converting the digital signal to the RF signal.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An apparatus of a wireless device, the apparatus comprising:
   memory; and
   processing circuitry configured to:
      generate a digital signal comprising an in-phase (I) signal component and a quadrature (Q) signal component having a peak-to-average-power-ratio (PAPR);
      determine whether the I signal component and the Q signal component are higher than a predetermined threshold value;
      adjust the I signal component and the Q signal component to be less than or equal to the predetermined threshold value, to generate the adjusted I and Q signal components, if the I signal component and the Q signal component are determined to be higher than the predetermined threshold value;
      rotate the adjusted I and Q signal components to generate rotated signal components to reduce the PAPR based on the I and Q signal components being less than or equal to the predetermined threshold value; and
      generate an output radio frequency (RF) signal based on the rotated signal components.

2. The apparatus of claim 1, further comprising:
   digital-to-analog conversion (DAC) circuitry comprising a plurality of thermometer-coded DAC cells, the DAC circuitry configured to generate the RF signal for transmission.

3. The apparatus of claim 2, wherein the threshold value is the number of the DAC cells divided by square-root of two.

4. The apparatus of claim 1, wherein the processing circuitry is configured to rotate the I and Q signal components by 45 degrees.

5. The apparatus of claim 1, wherein the rotated I signal component is I' and the processing circuitry is configured to:
   generate I' based on the equation I'=1/sqrt(2)*(I−Q).

6. The apparatus of claim 1, wherein the rotated Q signal component is Q' and the processing circuitry is configured to:
generate Q' based on the equation Q'=1/sqrt(2)*(Q+I).

7. The apparatus of claim 1, wherein the processing circuitry comprises a baseband processor.

8. The apparatus of claim 7, wherein the baseband processor comprises:
an I/Q signal generator to generate the I and Q signal components;
clipping circuitry to adjust the I signal component and the Q signal component to be less than or equal to a predetermined threshold value; and
rotation circuitry to rotate the I and Q signal components to generate the rotated I and Q signal components based on the I and Q signal components being less than or equal to the predetermined threshold value.

9. The apparatus of claim 1, wherein the processing circuitry is configured to:
determine one or both of the I signal component and the Q signal component are higher than the number of the DAC cells divided by square-root of two; and
adjust one or both of the I signal component and the Q signal component that are higher, to be equal to the number of the DAC cells divided by square-root of two.

10. The apparatus of claim 1, wherein to determine the I signal component and the Q signal component are each higher than a threshold value, the processing circuitry is configured to:
determine a sum of an absolute value of the I signal component and an absolute value of the Q signal component is greater than a second threshold value; and
upon successful determination, project a signal point associated with the I and Q signal components to a new signal point to reduce the PAPR, wherein the new signal point is associated with I" and Q" signal components and wherein a sum of absolute values of I" and Q" is equal to, or lower than, the second threshold value.

11. The apparatus of claim 10, wherein to project the signal point, the processing circuitry is configured to:
determine I" and Q" based on the equations I"=((I−Q)+X)/2 and Q"=I"−(I−Q), wherein X is the second threshold value and the I" and Q" signal components have the same polarity sign as the I and Q signal components, respectively.

12. A method for reducing peak-to-average-power-ratio (PAPR) of a digital signal with an in-phase (I) signal component and a quadrature (Q) signal component, the method comprising:
determining one or both of the I signal component and the Q signal component are higher than a threshold value;
upon successful determination, adjusting one or both of the I signal component and the Q signal component that are higher than the threshold value, to be equal to, or lower than, the threshold value;
rotating the adjusted I and Q signal components by a pre-determined angle to generate rotated I and Q signal components and to reduce the PAPR; and
converting the digital signal to a radio frequency (RF) signal for transmission, based on the rotated I and Q signal components.

13. The method according to claim 12, further comprising:
assigning a polarity sign to the rotated I signal component that is the same as a polarity sign of the I signal component prior to the rotating; and
assigning a polarity sign to the rotated Q signal component that is the same as a polarity sign of the Q signal component prior to the rotating.

14. The method according to claim 12, the method further comprising:
supplying a local oscillator (LO) I signal and a LO Q signal to a plurality of thermometer-coded digital-to-analog conversion (DAC) cells to enable the converting.

15. The method according to claim 14, wherein the threshold value is based on a number of the thermometer-coded DAC cells.

16. The method according to claim 12, wherein the pre-determined angle is a 45-degree angle.

17. The method according to claim 16, wherein the rotated I signal component is I' and the method further comprises:
generating I' based on the equation I'=1/sqrt(2)*(I−Q).

18. The method according to claim 16, wherein the rotated Q signal component is Q' and the method further comprises:
generating Q' based on the equation Q'=1/sqrt(2)*(I+Q).

19. The method according to claim 12, further comprising:
determining a sum of an absolute value of the I signal component and an absolute value of the Q signal component is greater than a second threshold value.

20. The method according to claim 19, further comprising:
upon successful determination, projecting a signal point associated with the I and Q signal components to a new signal point of a second digital signal with corresponding I" and Q" signal components,
wherein a sum of absolute values of the I" and Q" signal components is equal to the second threshold value, and wherein a PAPR of the second digital signal is lower than the PAPR of the digital signal.

21. The method according to claim 20, wherein the projecting further comprises:
determining I" and Q" based on the equations I"=((I−Q)+X)/2 and Q"=I"−(I−Q), wherein X is the second threshold value and the I" and Q" signal components have the same polarity sign as the I and Q signal components, respectively.

22. A non-transitory computer-readable medium comprising instructions that, when executed on processing circuitry of a user equipment (UE), cause the UE to:
generate a digital signal, the digital signal comprising an in-phase (I) signal component and a quadrature (Q) signal component, the digital signal associated with a peak-to-average-power-ratio (PAPR);
determine a sum of an absolute value of the I signal component and an absolute value of the Q signal component is greater than a predetermined threshold value;
upon successful determination, reduce the PAPR by projecting a signal point associated with the I and Q signal components to a new signal point with corresponding I' and Q' signal components, wherein a sum of absolute values of the I' and Q' signal components is less than or equal to the predetermined threshold value; and
convert the digital signal to a radio frequency (RF) signal for transmission, based on the I' and Q' signal components.

23. The non-transitory computer-readable medium according to claim 22, wherein the instructions further cause the UE to:
   determine the I' and Q' signal components based on the equations I'=((I−Q)+X)/2 and Q'=I'−(I−Q), wherein X is the threshold value and the I' and Q' signal components have the same polarity sign as the I and Q signal components, respectively.

24. The non-transitory computer-readable medium according to claim 22, wherein the threshold value is a number of thermometer-coded digital-to-analog conversion (DAC) cells used for converting the digital signal to the RF signal.

25. An apparatus of a wireless device, the apparatus comprising:
   memory;
   processing circuitry configured to:
      generate a digital signal comprising an in-phase (I) signal component and a quadrature (Q) signal component having a peak-to-average-power-ratio (PAPR);
      determine whether the I signal component and the Q signal component are higher than a predetermined threshold value;
      adjust the I signal component and the Q signal component to be less than or equal to the predetermined threshold value, if the I signal component and the Q signal component are determined to be higher than a predetermined threshold value;
      rotate the signal components to generate rotated signal components to reduce the PAPR based on the I and Q signal components being less than or equal to the predetermined threshold value; and
   digital-to-analog conversion (DAC) circuitry comprising a plurality of thermometer-coded DAC cells, the DAC circuitry configured to generate an output radio frequency (RF) signal for transmission based on the rotated signal components.

26. The apparatus of claim 25, wherein the threshold value is based on the number of thermometer-coded DAC cells.

* * * * *

UNITED STATES PATENT AND TRADEMARK OFFICE
CERTIFICATE OF CORRECTION

PATENT NO. : 9,985,811 B2  
APPLICATION NO. : 15/274721  
DATED : May 29, 2018  
INVENTOR(S) : Mayer et al.

Page 1 of 1

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 12, Line 38, in Claim 1, after "whether", insert --one or both of--

In Column 12, Line 41, in Claim 1, after "adjust", insert --one or both of--

In Column 12, Line 49, in Claim 1, after "on", insert --one or both of--

In Column 13, Line 27, in Claim 10, after "determine", insert --one or more of--

In Column 13, Line 28, in Claim 10, after "are", delete "each"

In Column 16, Line 1, in Claim 25, after "whether", insert --one or both of--

In Column 16, Line 4, in Claim 25, after "adjust", insert --one or both of--

In Column 16, Line 6, in Claim 25, after "if", insert --one or both of--

Signed and Sealed this  
Twenty-eighth Day of May, 2019

Andrei Iancu  
*Director of the United States Patent and Trademark Office*